June 11, 1957  C. R. CHRISTIAN  2,795,075
FISHING LURE
Filed May 10, 1954
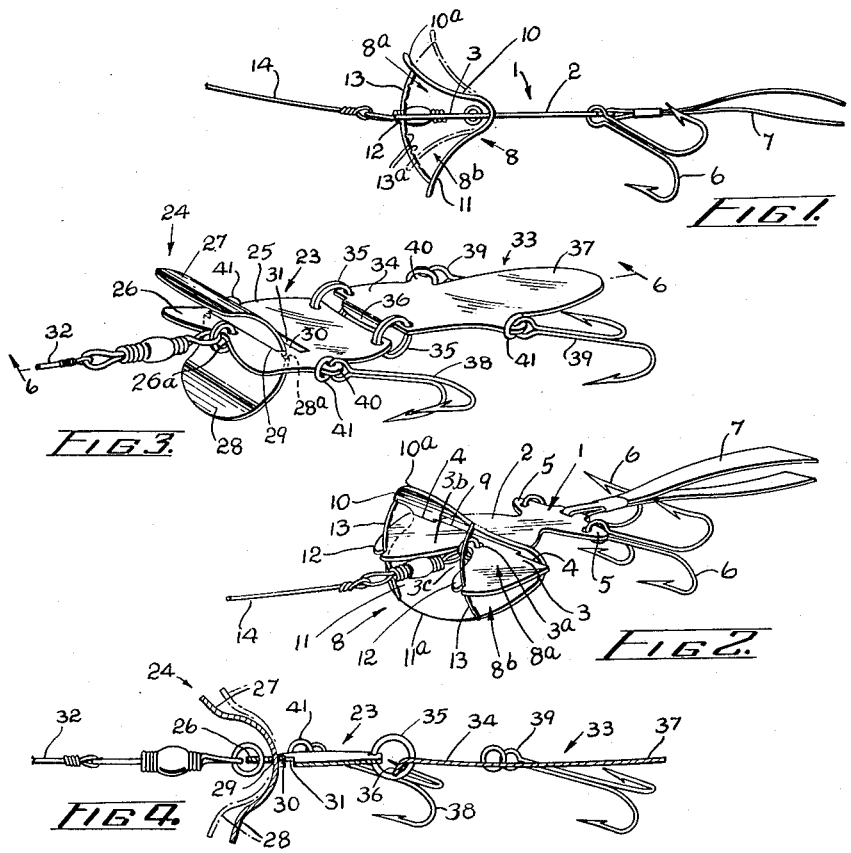
INVENTOR
C. R. CHRISTIAN
BY
Maybee & Legris
ATTORNEYS.

United States Patent Office 2,795,075
Patented June 11, 1957

2,795,075

FISHING LURE

Clarence Robert Christian, Toronto, Ontario, Canada

Application May 10, 1954, Serial No. 428,704

11 Claims. (Cl. 43—42.22)

This invention relates to fishing lures, and in particular to invertible fishing lures.

An important object of the invention is to provide a lure which has an up and down movement (or "gallop") as it is pulled forward, rather than a conventional spin or side to side movement ("wobble"), the lure being easily invertible for different fishing conditions.

Two embodiments of the invention are illustrated in the accompanying drawings, from which it will be seen that lures constructed according to the invention are of simple construction and yet capable of striking action in the water. In the drawings:

Fig. 1 is a side view of an invertible lure, indicating in dotted lines how the lure may be adjusted;

Fig. 2 is a front perspective view of the lure;

Fig. 3 is a front perspective view of another form of invertible lure; and

Fig. 4 is a longitudinal sectional view of the lure shown in Fig. 3, indicating in dotted lines how the lure may be adjusted.

The lure shown in Figs. 1 and 2 is formed with a thin, flat plate 1 having a rear body or plate portion 2, a wider front tongue portion 3, and edges or shoulders 4 at the junction of said portions. At the rear the body portion has a pair of wings 5, one at each longitudinal edge of the plate, to which double hooks 6 are connected, the hooks at one edge facing away from those at the other. The body portion is sufficiently wide at the wings to prevent the hooks 6 at either side from catching each other. A tail 7, which in the embodiment illustrated is of flexible waterproof material, is pivotally connected to the rear end of the body portion 2. Alternatively a piece of pork rind may serve as a tail, or the tail may be eliminated altogether.

A scoop 8 is mounted on the plate 1, the scoop having an elongated slot 9 which permits it to be slipped over the body portion 2 before the hooks 6 and tail 7 are mounted on the body portion. The scoop 8 fits against the shoulders 4 and is pivotable on the plate 1 with the shoulders 4 acting as a fulcrum. The scoop has an upper lip or plate 10 and a lower lip 11, and these lips extend forwardly, respectively above and below the tongue portion 3, the lips diverging from their junction or line of intersection with the tongue and body portions 3, 2, and being spaced from the tongue portion 2 and from each other. The forward edges 10a, 11a of the lips are bent upwardly and downwardly, respectively, and both edges curve rearwardly to shed any foreign matter, such as weeds.

The tongue portion 3 divides the scoop into two portions 8a and 8b. The tongue portion is bifurcated, having two parts 12 which extend farther forward than the forward edges 10a, 11a of the lips 10, 11. A pair of wires 13 are connected at their ends to the edges 10a, 11a and frictionally engage the forward tips of the parts 12, the wires thus curving rearwardly from those tips to shed weeds or the like. Each wire has a plurality of notches 13a selectively engageable with notches in the tips of the parts 12. It will be seen that the wires 13 hold the scoop 8 against the shoulders 4, and the relative sizes of the scoop portions 8a, 8b can be varied by changing the notches 13a that are in engagement with the tongue portion 3.

The forward edge of the tongue portion 3 has, between the parts 12, a rearwardly recessed part 3b defining a recess 3c into which a fishing line 14 may extend. Adjacent to and rearward of this recessed part the tongue portion 3 has a hole 3a at which the fishing line is connected, the hole 3a being adjacent the junction of the tongue and body portions 3, 2 so that the line 14 is connected to the tongue portion close to the horizontal pivotal axis of the scoop 8.

The lure is illustrated (in full lines) with the scoop in such a position that the portion 8b is larger than the portion 8a. This throws the centre of gravity of the lure below the plate 1, and consequently when the lure is dropped into the water the scoop portion 8b becomes the lowermost of the two, the plate 1 lying generally horizontally in the water. As the lure is pulled along, the front concave surface provided by the scoop catches water, more water being caught by the larger scoop portion 8b than by the portion 8a, and consequently the drag of the lure is greater below the plate 1 than above it. This causes the lure to dip, raising its rear end, until the raised rear end of the plate portion 2 (the flat surfaces of which are freely exposed) increases the drag above the plate sufficiently to pull the rear end down again. The action then repeates, the upward and downward bobbing of the plate 1 causing the tail 7 to wiggle in a vertical plane as well. It is to be noted that the scoop has a large frontal area as compared to the cross-sectional area of the body portion behind the scoop, and the vertical distance between the ends of the lips is great compared to the vertical thickness of the body portion, so that the body portion creates an effective drag only after it has been lifted appreciably by the action of the scoop and the tongue portion.

The action of the lure is striking, and can be increased by increasing the size of scoop portion 8b relative to that of portion 8a. Greater action is also obtained by widening the tongue portion 3, and it will be noted that in Fig. 2 the tongue portion is slightly wider than the scoop 8. The location of the point of connection 3a is also important, the period of lure vibration decreasing, and the power with which the lure kicks increasing, the closer the point of connection to the vertex of the scoop 8. The action is so powerful that the tail 7 may be quite heavy, and of course a longer tail may be used where the action is too violent.

If the tongue portion 3 is midway between the lips 10 and 11 the lure may turn on its side and act as a side to side wobbler. However up and down galloping is preferred. The plate 1 may have a silver or nickel finish on one side and a gold, brass, or red and white colour on the opposite side. If the scoop is adjusted to the position shown in full lines in Fig. 1, portion 8b is lowermost, and the nickel finish, say, of the plate 1 faces downwardly; this adjustment is preferred when fishing deep, or on a dull day. If the scoop is adjusted to the position shown in dotted lines in Fig. 2, the lure will flip over and the brass finish, say, faces downwardly; this adjustment is preferred when fishing in shallow, clear water and on a bright day.

The tongue portion 3 separating the lips 10, 11 ensures that the lure vibrates up and down in a direction normal to the plate 1, and only by suddenly jerking the line can one make the lure swing from side to side in the plane of the plate.

Often floating weeds are caught by a fishing line, and they follow the line down to the lure. Since the wires 13 extend convexly forwardly between the lips 10, 11 and the forward edges of the lips 10, 11 and tongue 3 extend rearwardly from the wires 13, the wires and forward edges are very effective in shedding such weeds, and are aided by the rapid vibration of the lure.

Another invertible lure is shown in Fig. 3. This lure has a thin plate 23 divided by a scoop 24 into a rear body or plate portion 25 and a front tongue portion 26. The scoop has an upper lip 27 and a lower lip 28, the upper lip being slightly narrower than the lower so that it may be passed upwardly through a slot 29 in the plate 23, when assembling the scoop and plate, until shoulders 28a on the lower lip abut against the plate. The scoop is soldered to a narrow strip 30 of the plate 23, the strip being formed by slotting the plate as at 29 and 31. Rearwardly of the front edge of the slot 29 the substantially flat plate 23 is dished, having its greatest concavity along the slot 31. The normal position of the scoop 24 is the dotted line position shown in Fig. 4, where the strip 30 is also in its dotted line position holding the scoop with the lip 27 and tongue portion 26 defining a larger scoop portion than the lip 28 and tongue portion 26 so that the lure, when in the water, flips over from the position shown in the drawings. To cause the lure to occupy the position shown in the drawings when in the water, it is necessary to press the strip 30 from the dotted to the full line position, where the strip is sprung outwardly from the plate 23 and is also twisted from its dotted line position due to the greater initial concavity along its rear edge than along its forward edge. Due to the twisting of the strip 30 the scoop is caused to pivot about a horizontal axis to the full line position. The plate 23 and strip 30 should be of a material such as brass which will permit repeated springing of the strip between its dotted and full line positions without breaking.

As in the embodiment previously described, the tongue portion of plate 23 is recessed as at 26a to permit connection of a line 32 adjacent the junction of the scoop with the plate.

The lure of Fig. 3 has a tail 33 consisting of a thin plate 34 pivotally connected to the rear end of the plate 23 by means of rings 35. The plate 34 is substantially flat, having a downturned front end portion 36 and an upwardly curving rear end portion 37, and these portions assist in the galloping motion of the lure due to their inclinations to the direction of motion of the lure. As in the embodiment of Figs. 1 and 2, the substantially flat upper and lower surfaces of the plates 23 and 34 are freely exposed to the water when the lure is in use.

At the longitudinal edges of the front plate 23 are connected double hooks 38, the hooks at opposite edges of the plate facing away from each other as is the case with the hooks 6 of Fig. 2, and at the longitudinal edges of the rear plate 34 are connected double hooks 39 which face towards each other with the plate 34 intervening between them. It has been found that if the hooks 39 at opposite edges of the plate 34 face away from each other, as is the case in most double spoons, a fish caught on a hook 39 may roll, doubling the rear plate 34 over the front one 25, and the fish's weight may then jerk the hook out of its mouth. This does not happen when the hooks 39 face towards each other.

To prevent the hooks 38, 39 from catching on parts of the lure ahead of them, the hooks are connected to small ears 40 encircled by rings 41 which prevent the hooks from swinging too far forwardly.

It is to be understood that the forms of the invention, herewith shown and described, are to be taken as preferred examples of the same, and that various changes in the shape, size and arrangement of the parts may be resorted to without departing from the scope of the claims.

What I claim as my invention is:

1. An invertible fishing lure comprising a body portion having at the front a scoop pivotally mounted on the body portion about a horizontal axis, the scoop comprising an upper and a lower lip, and a thin, flat, horizontal tongue between the lips and fast with the body portion, the lips diverging in a forward direction away from each other and from the tongue, the tongue being at least as wide as said lips and thus dividing the scoop into separated upper and lower portions the relative sizes of which may be varied by pivoting the scoop about said horizontal axis, the lure being so balanced that it may be inverted by pivotal adjustment of the scoop relative to the body portion.

2. An invertible fishing lure comprising a thin plate, a scoop intersecting the plate and dividing it into a front tongue portion and a rear plate portion having substantially flat surfaces freely exposed, the scoop being pivotally mounted on the plate at its intersection therewith and having a lip at each side of the plate, the lips extending forwardly from said intersection and diverging from each other and from the tongue portion, the tongue portion dividing the scoop into separated upper and lower portions, the lure being so balanced that it may be inverted by pivotal adjustment of the scoop relative to the plate.

3. An invertible fishing lure comprising a thin plate, the plate having a rear body portion, a front tongue portion, and shoulders between said portions, the body portion having longitudinal side edges, hooks connected to the body portion along said edges, a tail pivotally connected to the rear end of the body portion, a scoop fitting over the body portion against said shoulders and having a lip extending forwardly at either side of the tongue portion, each lip having a rearwardly curving forward edge, the tongue portion having a forward edge two parts of which extend farther forward than the forward edges of the lips, and a pair of wires each connecting the forward edge of the upper lip to the forward edge of the lower lip and each frictionally engaging one of said parts of the forward edge of the tongue portion, the wires holding the scoop pivotally against said shoulder, the forward edge of the tongue portion having a rearwardly recessed part between its two said forwardly extending parts, the tongue portion having means adjacent the body portion and said recessed part for connecting a fishing line, and the lure being so balanced that it may be inverted by pivotal adjustment of the scoop relative to the plate.

4. An invertible fishing lure comprising a thin plate, a scoop intersecting the plate and dividing it into a front tongue portion and a rear plate portion having substantially flat surfaces freely exposed, the scoop being pivotally mounted on the plate at its intersection therewith and having a lip at each side of the plate, the lips extending forwardly from said intersection and diverging from each other and from the tongue portion, the tongue portion dividing the scoop into separated upper and lower portions, a second thin plate pivotally connected to the rear end of said plate portion, and a hook connected to the second plate adjacent each of the plate's longitudinal edges, the hooks at opposite edges of the second plate facing each other, and the lure being so balanced that it may be inverted by pivotal adjustment of the scoop relative to the first mentioned plate.

5. A lure as claimed in claim 1, in which means are provided for connecting a fishing line to the tongue, in which the lips and tongue have forward edges, and in which at either side of the fishing line connection a wire connects the forward edge of the upper lip to the forward edge of the lower lip, the wires frictionally engaging the forward edge of the tongue to resist pivotal movement of the scoop relative to the tongue, the wires extending convexly forwardly between the lips, and the forward edges of the lips and tongue extending rearwardly from the wires whereby the wires and forward edges tend to cast off weeds.

6. A lure as claimed in claim 1, in which connecting means are provided adjacent the horizontal pivotal axis of the scoop for securing a fishing line to the tongue.

7. A lure as claimed in claim 6, in which the tongue has a forward edge that is recessed rearwardly in front of the connecting means.

8. A lure as claimed in claim 2, in which the plate has longitudinal side edges and hooks are connected to the plate along said edges.

9. A lure as claimed in claim 2, in which the thin plate has shoulders between the front tongue portion and the rear body portion, in which the scoop fits over the body portion against the shoulders, and in which wires connect the lips of the scoop and frictionally engage the tongue portion of the plate to hold the scoop pivotally against the shoulders, the wires also serving to cast off weeds.

10. A lure as claimed in claim 2, in which the tongue portion has a forward edge, and in which at least one wire extends convexly forwardly between the lips and engages the forward edge of the tongue portion to resist pivotal movement of the scoop relative to the thin plate.

11. A lure as claimed in claim 10, in which the thin plate has forwardly of the scoop an edge on which the scoop pivots, the wire holding the scoop against said edge.

References Cited in the file of this patent

UNITED STATES PATENTS

| | | |
|---|---|---|
| 1,615,803 | Pflueger | Jan. 25, 1927 |
| 1,742,786 | Roberts | Jan. 7, 1930 |
| 1,773,561 | Wethall | Aug. 19, 1930 |
| 2,017,333 | Zuck | Oct. 15, 1935 |
| 2,313,709 | Dunkelberger | Mar. 9, 1943 |
| 2,495,134 | Roberts | Jan. 17, 1950 |
| 2,578,786 | Davis | Dec. 18, 1951 |
| 2,615,274 | Slough | Oct. 28, 1952 |
| 2,673,417 | Murphy | Mar. 30, 1954 |